(12) United States Patent
Kiesel

(10) Patent No.: US 9,092,315 B2
(45) Date of Patent: Jul. 28, 2015

(54) METHOD AND SOFTWARE PROGRAM PRODUCT FOR DETERMINING THE QUALITY OF AN INFORMATION TECHNOLOGY SYSTEM

(75) Inventor: Burkhard Kiesel, Wiesenthau (DE)

(73) Assignee: Siemens Aktiengesellschaft, München (DE)

( * ) Notice: Subject to any disclaimer, the term of this patent is extended or adjusted under 35 U.S.C. 154(b) by 714 days.

(21) Appl. No.: 13/167,678

(22) Filed: Jun. 23, 2011

(65) Prior Publication Data

US 2012/0166888 A1 Jun. 28, 2012

(30) Foreign Application Priority Data

Jun. 24, 2010 (DE) .......................... 10 2010 024 966

(51) Int. Cl.
*G06F 11/00* (2006.01)
*G06F 11/34* (2006.01)

(52) U.S. Cl.
CPC .......... *G06F 11/008* (2013.01); *G06F 11/3452* (2013.01)

(58) Field of Classification Search
CPC ............ G06F 11/3452; G06F 11/3447; G06F 11/3409
USPC ....................................... 714/47.1, 47.2, 47.3
See application file for complete search history.

(56) References Cited

U.S. PATENT DOCUMENTS

| 5,819,028 | A | * | 10/1998 | Manghirmalani et al. ...... 714/57 |
| 8,020,045 | B2 | * | 9/2011 | Morimura et al. .............. 714/26 |
| 8,086,899 | B2 | * | 12/2011 | Basu et al. ...................... 714/26 |
| 8,307,011 | B2 | * | 11/2012 | Chiaramonte et al. ........ 707/798 |
| 2003/0204789 | A1 | * | 10/2003 | Peebles et al. .................. 714/47 |
| 2009/0138239 | A1 | * | 5/2009 | Golani et al. ................. 702/186 |
| 2010/0017167 | A1 | * | 1/2010 | Duc et al. ..................... 702/185 |

FOREIGN PATENT DOCUMENTS

DE   10 2008 040 461 A1   1/2010

OTHER PUBLICATIONS

German Office Action dated Oct. 6, 2010 for corresponding German Patent Application No. DE 10 2010 024 966.1-53 with English translation.

* cited by examiner

*Primary Examiner* — Yolanda L Wilson
(74) *Attorney, Agent, or Firm* — Lempia Summerfield Katz LLC

(57) ABSTRACT

The present embodiments disclose a method and an associated computer program product for determining the quality of an information technology (IT) system including a plurality of hardware units and software modules. A total score value for the IT system is calculated from different score values ascertained independently of one another. The different score values are measures for deviations of the quality of the hardware units or the software modules from first predefinable target values. The total score value is a measure of a deviation of the quality of the IT system from a second predefinable target value.

15 Claims, 1 Drawing Sheet

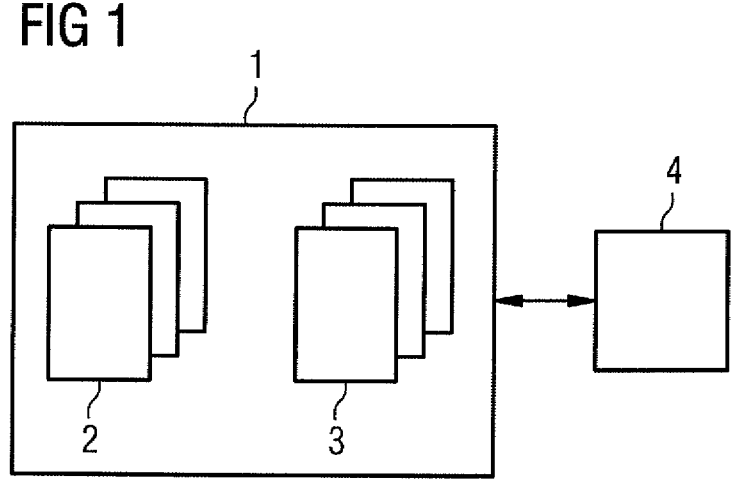
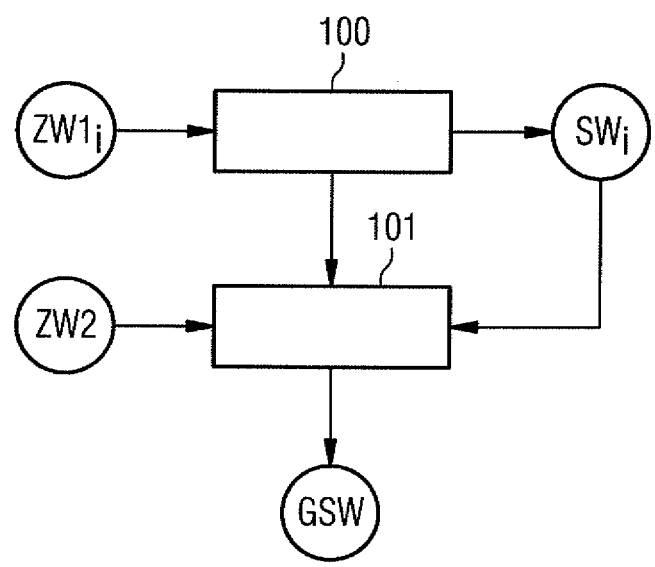

METHOD AND SOFTWARE PROGRAM PRODUCT FOR DETERMINING THE QUALITY OF AN INFORMATION TECHNOLOGY SYSTEM

This application claims the benefit of DE 10 2010 024 966.1, filed Jun. 24, 2010.

BACKGROUND

The present embodiments relate to a method and an associated software program product for determining the quality of an information technology system including a plurality of hardware units and software modules.

It is difficult to ascertain the overall status of an information technology system (e.g., an IT system). The status of an IT system is inadequately determined with the aid of known diagnostic programs. The status may be designated using identifiers such as "critical," "error" or "warning." The coarse classification of status types does not satisfactorily and comprehensively describe the overall status of an IT system.

It is known to determine defective components of a complex system by linking a plurality of diagnostic algorithms. DE 10 2008 040 461 A1, for example, discloses a method and a device for identifying faulty components in a system having a plurality of interacting components. Lists of potentially faulty components are generated as a function of various diagnostic algorithms that are executed independently of one another, and each potentially faulty component is assigned an error value. For at least a selection of components of the system, the error values are linked to produce an error score value for a particular potentially faulty component.

SUMMARY AND DESCRIPTION

A need to locate defective components quickly and reliably and to determine the quality of an information technology (IT) system exists. The present embodiments may obviate one or more of the drawbacks or limitations in the related art. For example, a method and a software program product for determining the quality of an information technology system may be disclosed.

The present embodiments provide a method for determining the quality of an IT system including a plurality of hardware units and software modules, where a total score value for the IT system is calculated from different score values. The different score values are ascertained independently of one another. The different score values are measures for deviations of the quality of the hardware units or software modules from first predefinable target values. The total score value is a measure of a deviation of the quality of the IT system from a second predefinable target value. The present embodiments offer the advantage that the "state of health" of the IT system may be described according to a very finely graduated scale. For example, the total score value is calculated once daily and used to supplement proactive monitoring.

A rising total score value may be an indicator of an imminent failure of the IT system. This enables failures to be detected easily and effectively at an early stage. Repairs carried out on IT systems lead to an improvement in the total score value.

In one embodiment, the quality of the IT system may include the failure probability of the IT system, and the quality of a hardware unit or a software module may include a measure of the severity and a number of error messages of the hardware unit or the software module.

In another embodiment, the quality of the IT system may include the processing speed of the IT system, and the quality of the hardware unit or the software module may include a measure of the processing speed of the hardware unit or the software module.

The second target value may be the quality of an optimally configured IT system.

In one embodiment, the quality of the hardware unit or the software module may be determined using diagnostic algorithms.

The total score value may also be calculated using a weighted addition of the score values.

The present embodiments also disclose a computer program product including a computer program that has software for performing a method according to the present embodiments when the computer program is executed in a control unit of a Service Center, for example.

BRIEF DESCRIPTION OF THE DRAWINGS

FIG. 1 shows a block diagram of one embodiment of an information technology system; and FIG. 2 shows a flowchart for one embodiment of a method for determining the quality of one embodiment of the information technology system.

DETAILED DESCRIPTION OF THE DRAWINGS

FIG. 1 shows a schematic block diagram of an information technology (IT) system 1. The IT system 1 includes a plurality of hardware units 2 and a plurality of software modules 3. For remote monitoring and remote control purposes, the IT system is communicatively connected to a central Service Center 4. System data of the IT system 1 is collected in the central Service Center 4 with the aid of an intelligent data collector. The quality of the IT system is determined in the central Service Center 4 on the basis of the collected data in accordance with the methods of the present embodiments that are described in more detail below.

FIG. 2 shows a flowchart of one embodiment of a method for determining the quality of the IT system 1, the IT system including the plurality of hardware units 2 and the plurality of software modules 3. In act 100, n score values $SW_i$, where $i \in \{1, 2, \ldots n\}$, of the IT system 1 are determined independently of one another. The score values $SW_i$ are measures for deviations of the quality of the plurality of hardware units 2 or the plurality of software modules 3 from first predefinable n target values $ZW1_i$, where $i \in \{1, 2, \ldots n\}$.

In act 101, a total score value GSW for the IT system 1 is calculated from the score values $SW_i$. The total score value GSW is a measure of a deviation of the quality of the IT system 1 from a second predefinable target value ZW2.

The quality of the IT system 1 may be a measure of the failure probability of the IT system 1, for example. The quality of a hardware unit 2 or a software module 3 may be a measure of the severity and number of error messages of the hardware unit 2 or software module 3.

The quality of the IT system 1 may also be the processing speed of the IT system 1. The quality of a hardware unit 2 or the software module 3 may be a measure of the processing speed of the hardware unit 2 or the software module 3.

The second predefinable target value ZW2 may be the quality of an optimally configured IT system 1.

The quality of the hardware unit 2 or the software module 3 may be determined using diagnostic algorithms.

In one embodiment, the total score value GSW is calculated using a weighted addition of the n score values $SW_i$.

A computer program product including a computer program may be used for performing the methods of the present embodiments, according to FIG. 2. The computer program includes non-transitory computer readable media having software for performing the method according to the present embodiments when the computer program is executed in a control unit of the central Service Center 4.

Not only are defective states detected more quickly and in a more targeted manner using the present embodiments, the performance of the IT system 1 may also be improved.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining a quality of an information technology (IT) system comprising a plurality of hardware units and software modules, the method comprising:
calculating a total score value for the IT system from different score values ascertained independently of one another,
wherein the different score values are measures for deviations of qualities of hardware units and software modules of the plurality of hardware units and software modules from first predefinable target values,
wherein the total score value is a measure of a deviation of the quality of the IT system from a second predefinable target value,
wherein the quality of the IT system includes a failure probability of the IT system, the failure probability of the IT system comprising the qualities of both the hardware units and the software modules,
wherein the quality of each hardware unit comprises (1) a measure of severity of the hardware unit and (2) a number of error messages of the hardware unit, and
wherein the quality of each software module comprises (1) a measure of severity of the software module and (2) a number of error messages of the software module.

2. The method of claim 1,
wherein the quality of the IT system further includes a processing speed of the IT system.

3. The method as claimed in claim 2, wherein the second predefinable target value is the quality of an optimally configured IT system.

4. The method as claimed in claim 2, wherein the quality of the hardware unit or the software module of the plurality of hardware units and software modules is determined using diagnostic algorithms.

5. The method as claimed in claim 2, wherein the total score value is calculated using a weighted addition of the different score values.

6. The method as claimed in claim 1, wherein the second predefinable target value is the quality of an optimally configured IT system.

7. The method as claimed in claim 6, wherein the quality of the hardware unit or the software module of the plurality of hardware units and software modules is determined using diagnostic algorithms.

8. The method as claimed in claim 6, wherein the total score value is calculated using a weighted addition of the different score values.

9. The method as claimed in claim 1, wherein the quality of the hardware unit or the software module of the plurality of hardware units and software modules is determined using diagnostic algorithms.

10. The method as claimed in claim 9, wherein the total score value is calculated using a weighted addition of the different score values.

11. The method as claimed in claim 1, wherein the total score value is calculated using a weighted addition of the different score values.

12. The method as claimed in claim 1, wherein the quality of the IT system further includes a processing speed of the IT system, and
wherein the quality of the hardware unit or the software module further includes a measure of a processing speed of the hardware unit or the software module.

13. A computer program product comprising a non-transitory computer readable medium having software including instructions that, when executed in a control unit, determines a quality of an information technology (IT) system comprising a plurality of hardware units and software modules, the instructions comprising:
calculating a total score value for the IT system from different score values ascertained independently of one another,
wherein the different score values are measures for deviations of qualities of hardware units and software modules of the plurality of hardware units and software modules from first predefinable target values,
wherein the total score value is a measure of a deviation of the quality of the IT system from a second predefinable target value, and
wherein the quality of the IT system includes a failure probability of the IT system, wherein the failure probability of the IT system comprises the qualities of both the hardware units and the software modules,
wherein the quality of each hardware unit comprises (1) a measure of severity of the hardware unit and (2) a number of error messages of the hardware unit, and
wherein the quality of each software module comprises (1) a measure of severity of the software module and (2) a number of error messages of the software module.

14. The computer program product of claim 13, wherein the quality of the IT system further includes the processing speed of the IT system.

15. The computer program product of claim 14, wherein the quality of a hardware unit or a software module of the plurality of hardware units and software modules includes a measure of the processing speed of the hardware unit or the software module.

* * * * *